United States Patent
Yen et al.

(10) Patent No.: US 11,340,519 B2
(45) Date of Patent: May 24, 2022

(54) LIGHT SOURCE HEAT-DISSIPATING DEVICE AND PROJECTION APPARATUS

(71) Applicant: Coretronic Corporation, Hsin-Chu (TW)

(72) Inventors: Chun-Lung Yen, Hsin-Chu (TW); Te-Tang Chen, Hsin-Chu (TW); Wen-Jui Huang, Hsin-Chu (TW); Tsung-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 64 days.

(21) Appl. No.: 16/796,948

(22) Filed: Feb. 21, 2020

(65) Prior Publication Data
US 2020/0272037 A1 Aug. 27, 2020

(30) Foreign Application Priority Data
Feb. 26, 2019 (CN) .......................... 201910141641.1

(51) Int. Cl.
*G03B 21/16* (2006.01)
*F21V 29/67* (2015.01)
*F21V 29/74* (2015.01)

(52) U.S. Cl.
CPC ............ *G03B 21/16* (2013.01); *F21V 29/673* (2015.01); *F21V 29/74* (2015.01)

(58) Field of Classification Search
CPC .............. G03B 21/16; G03B 21/00–64; H04N 9/3144; H04N 9/31–3197; F21V 29/00–90
See application file for complete search history.

(56) References Cited

U.S. PATENT DOCUMENTS

| | | | |
|---|---|---|---|
| 2005/0225963 A1 | 10/2005 | Huang et al. | |
| 2009/0190100 A1 | 7/2009 | Tanaka et al. | |
| 2011/0051453 A1 | 3/2011 | Nagasawa et al. | |
| 2011/0157560 A1* | 6/2011 | Hsiao | G03B 21/16 353/58 |

(Continued)

FOREIGN PATENT DOCUMENTS

| | | |
|---|---|---|
| CN | 101038430 A | 9/2007 |
| CN | 101055411 A | 10/2007 |

(Continued)

*Primary Examiner* — Michelle M Iacoletti
*Assistant Examiner* — Christopher A Lamb, II

(57) ABSTRACT

A light source heat-dissipating device is disposed in a projection apparatus having a casing with an air inlet. The light source heat-dissipating device has a heat-dissipating fin assembly disposed in the casing and having an air intake side, and first and second heat-dissipating fin assemblies, a first air duct, and a fan adjacent to the first and second heat-dissipating fin assemblies. The second heat-dissipating fin assembly is stacked on the first one. The first heat-dissipating fin assembly is between the second one and the air inlet. The first air duct is adjacently-disposed at the air intake side, has a first entrance end connected with the air inlet and a first exit end opposite to the first entrance. The light source heat-dissipating device and projection apparatus improve temperature and life consistency between light source modules. The heat dissipation performances of the first and second heat-dissipating fin assemblies tend to be consistent.

20 Claims, 7 Drawing Sheets

(56) References Cited

U.S. PATENT DOCUMENTS

| | | | |
|---|---|---|---|
| 2017/0277027 A1 | 9/2017 | Fukuda | |
| 2020/0099902 A1* | 3/2020 | Egawa | H04N 9/3144 |
| 2020/0241401 A1* | 7/2020 | Sano | G03B 21/2013 |

FOREIGN PATENT DOCUMENTS

| | | | |
|---|---|---|---|
| CN | 101131534 A | 2/2008 | |
| CN | 101988660 A | 3/2011 | |
| CN | 103698966 A | 4/2014 | |
| CN | 203882079 U | 10/2014 | |
| CN | 209327762 U | 8/2019 | |
| WO | WO-2018198278 A1 * | 11/2018 | H04N 9/3144 |

* cited by examiner

LIGHT SOURCE HEAT-DISSIPATING DEVICE AND PROJECTION APPARATUS

CROSS-REFERENCE TO RELATED APPLICATION

This application claims the priority benefit of China application 201910141641.1, filed on Feb. 26, 2019. The entirety of the above-mentioned patent application is hereby incorporated by reference herein and made a part of this specification.

FIELD OF THE INVENTION

The invention relates to a light source heat-dissipating device and a projection apparatus.

BACKGROUND OF THE INVENTION

In a conventional projection apparatus having a plurality of light source modules with the same structure, the light source modules are designed to have the same light source temperature to keep the light source modules have the same performance and service life. However, practically, as a result of the interior space design of the projection apparatus, the heat-dissipating fin assemblies corresponding to the light source modules are often arranged at different positions. Since the different positions are different in space, temperature, and heat dissipation efficiency, it is usually required to develop a plurality of heat-dissipating fin assemblies having different structural designs or sizes for the light source modules, so as to make the light source modules have the same light source temperature.

In order for the light source modules to have the same light source temperature, the following problems are raised:

First, between different heat-dissipating fin assemblies, it is required for the heat-dissipating fin assembly having a higher intake air temperature to increase the heat sink volume or additionally increase the fan flow rate.

Second, between different heat-dissipating fin assemblies, the heat pipe efficiency is affected by the spatial difference between the setting positions, resulting in a difference in the temperature and performance of the light source between the light source modules.

Third, between different heat-dissipating fin assemblies, if the spatial or volumetric difference is too large, producing different heat-dissipating fin assemblies with different molds is required, and thereby increasing the costs in development.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source heat-dissipating device, which have advantages of improving the temperature and service life consistency between a plurality of light source modules. In addition, a first air duct of the light source heat-dissipating device can adjust the heat dissipation performances of a first heat-dissipating fin assembly and a second heat-dissipating fin assembly, so as to make the heat dissipation performances tend to be consistent.

The invention provides a projection apparatus, which have advantages of improving the temperature and life consistency between a plurality of light source modules.

Other advantages and objects of the invention may be further illustrated by the technical features broadly embodied and described as follows.

In order to achieve one or a portion of or all of the objects or other objects, an embodiment of the invention provides a light source heat-dissipating device configured to be disposed in a projection apparatus. The projection apparatus has a casing. The casing has an air inlet. The light source heat-dissipating device includes a heat-dissipating fin assembly, a first air duct, and a fan. The heat-dissipating fin assembly is disposed in the casing and has an air intake side. The air intake side is adjacent to the air inlet. The heat-dissipating fin assembly includes a first heat-dissipating fin assembly and a second heat-dissipating fin assembly. The second heat-dissipating fin assembly is stacked on the first heat-dissipating fin assembly, and the first heat-dissipating fin assembly is positioned between the second heat-dissipating fin assembly and the air inlet. The first air duct is adjacently-disposed at the air intake side, and the first air duct has a first entrance end and a first exit end opposite to the first entrance. The first entrance end is connected with the air inlet. The fan is disposed in the casing, and is adjacent to the first heat-dissipating fin assembly and the second heat-dissipating fin assembly.

In order to achieve one or a portion of or all of the objects or other objects, an embodiment of the invention provides a projection apparatus including a light source device, a light valve, a projection lens and a light source heat-dissipating device. The projection apparatus has a casing. The projection apparatus includes a casing. The casing has an air inlet. The light source device is configured to provide an illumination beam. The light valve is disposed on a transmission path of the illumination beam to convert the illumination beam into an image beam. The projection lens is disposed on a transmission path of the image beam. The light source heat-dissipating device is disposed on a transmission path of a heat generated when the light source device provides the illumination beam. The light source device includes a first light source module and a second light source module. The first light source module and the second light source module generate a first thermal energy and a second thermal energy respectively when the light source device provides the illumination beam. The heat comprises the first thermal energy and the second thermal energy. The light source heat-dissipating device includes a heat-dissipating fin assembly, a first air duct, and a fan. The heat-dissipating fin assembly is disposed in the casing and has an air intake side adjacent to the air inlet. The heat-dissipating fin assembly includes a first heat-dissipating fin assembly and a second heat-dissipating fin assembly. The second heat-dissipating fin assembly is stacked on the first heat-dissipating fin assembly. The first heat-dissipating fin assembly is positioned between the second heat-dissipating fin assembly and the air inlet. The first air duct is adjacently-disposed at the air intake side, and the first air duct has a first entrance end and a first exit end opposite to the first entrance. The first entrance end is connected with the air inlet. The fan is disposed in the casing and is adjacent to the first heat-dissipating fin assembly and the second heat-dissipating fin assembly. The first heat-dissipating fin assembly is disposed on a transmission path of the first thermal energy, and the second heat-dissipating fin assembly is disposed on a transmission path of the second thermal energy.

In the light source heat-dissipating device and the projection apparatus of the invention, since the fan is disposed in the casing and is adjacent to the first heat-dissipating fin assembly and the second heat-dissipating fin assembly, the second heat-dissipating fin assembly is stacked on the first heat-dissipating fin assembly, and the air inlet is adjacent to the air intake side, when the airflow generated after the fan is turned on brings the heat generated by the heat generating components to enter the first heat-dissipating fin assembly and the second heat-dissipating fin assembly from the air intake side, the outside air entering the casing from the air inlet adjusts the temperatures of the first heat-dissipating fin assembly and the second heat-dissipating fin assembly at the air intake side, so as to make the temperatures of the first heat-dissipating fin assembly and the second heat-dissipating fin assembly at the air intake side tend to be consistent and make the heat dissipation performances of the first heat-dissipating fin assembly and the second heat-dissipating fin assembly at the air intake side tend to be consistent. Accordingly, the heat coming from the first light source module and the second light source module (the first light source module and the second light source module have the same design) and positioned at the first heat-dissipating fin assembly and the second heat-dissipating fin assembly can be dissipated by the consistent heat dissipation efficiency, and thereby achieving the effect that the lives and the temperatures of the first light source module and the second light source module tend to be consistent. Hence, the light source heat-dissipating device and projection apparatus have advantages of improving the temperature and life consistency between light source modules.

Other objectives, features and advantages of the invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
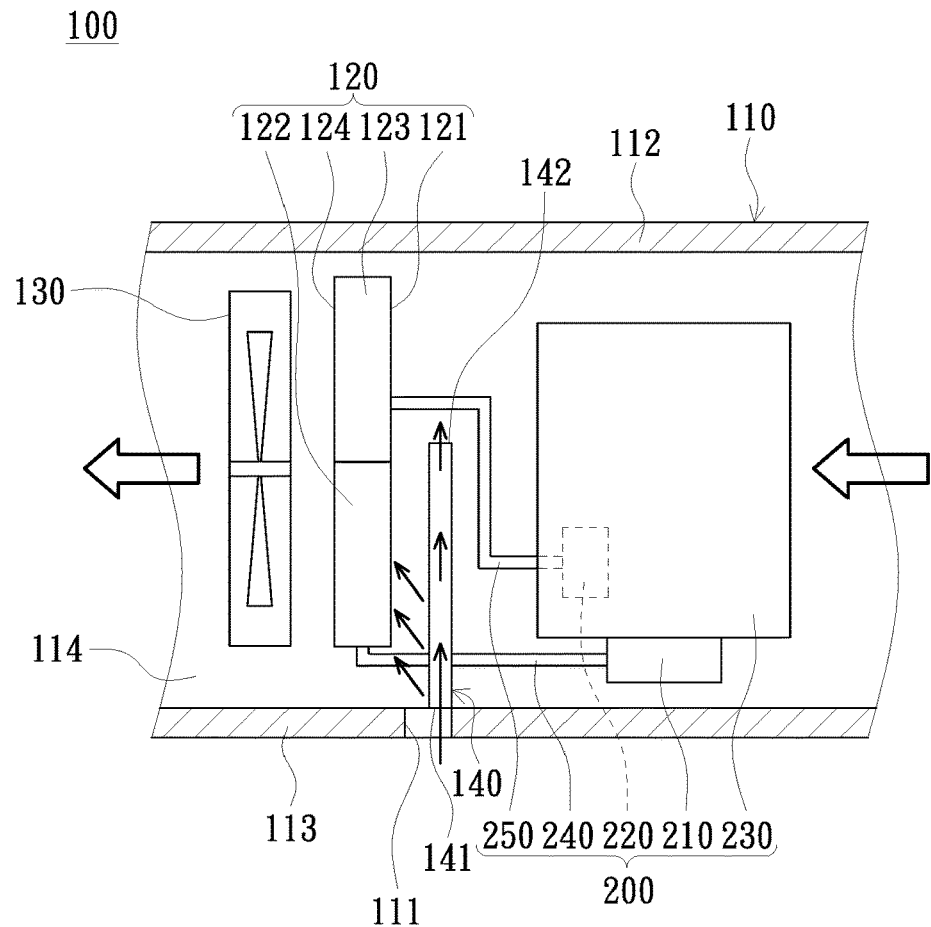
FIG. 1 is a schematic side view of a light source heat-dissipating device according to an embodiment of the invention.
Figure 2:
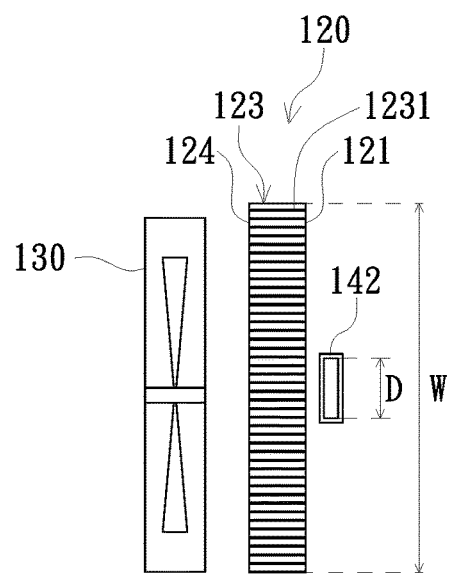
FIG. 2 is a schematic top view of a heat-dissipating fin assembly, a first air duct, and a fan shown in FIG. 1.

FIG. 1 is a schematic side view of a light source heat-dissipating device according to an embodiment of the invention. FIG. 2 is a schematic top view of a heat-dissipating fin assembly, a first air duct, and a fan shown in FIG. 1. Referring to FIGS. 1 and 2, the light source heat-dissipating device 100 is configured to be disposed in a projection apparatus. The projection apparatus includes a casing 110. The light source heat-dissipating device 100 includes a heat-dissipating fin assembly 120 and a fan 130. The casing 110 has an air inlet 111. The air inlet 111 is disposed at a bottom portion 113 of the projection apparatus. The heat-dissipating fin assembly 120 is disposed in the casing 110 and has an air intake side 121. The air inlet 111 of the casing 110 is positioned adjacent to the air intake side 121. The heat-dissipating fin assembly 120 includes a first heat-dissipating fin assembly 122 and a second heat-dissipating fin assembly 123. The second heat-dissipating fin assembly 123 is stacked on the first heat-dissipating fin assembly 122. That is, the first heat-dissipating fin assembly 122 is positioned between the second heat-dissipating fin assembly 123 and the bottom portion 113 with the air inlet 111. The fan 130 is disposed in the casing 110 and is adjacent to the first heat-dissipating fin assembly 122 and the second heat-dissipating fin assembly 123. In addition, the material of the casing 110 may be polymer materials, such as polyvinyl chloride, polypropylene, and so on, or metal materials, such as, magnesium, aluminum, iron, and so on, the material of the heat-dissipating fin assembly may be metal materials, such as, magnesium, aluminum, and so on, and the fan may be, for example, an axial fan, but the invention is not limited thereto. Further, in the embodiment, the casing 110 may include a top portion 112, the bottom portion 113, and a side portion 114 connected between the top portion 112 and the bottom portion 113. The air inlet 111 may be disposed through the bottom portion 113. The first heat-dissipating fin assembly 122 of the heat-dissipating fin assembly 120 may be disposed on the bottom portion 113. The heat-dissipating fin assembly 120 has an exhaust side 124 opposite to the air intake side 121. The fan 130 is disposed between the top portion 112 and the bottom portion 113, and is adjacent to the exhaust side 124. The fan 130 is configured for directing the airflow passing through the heat-dissipating fin assembly 120.

Figure 6:
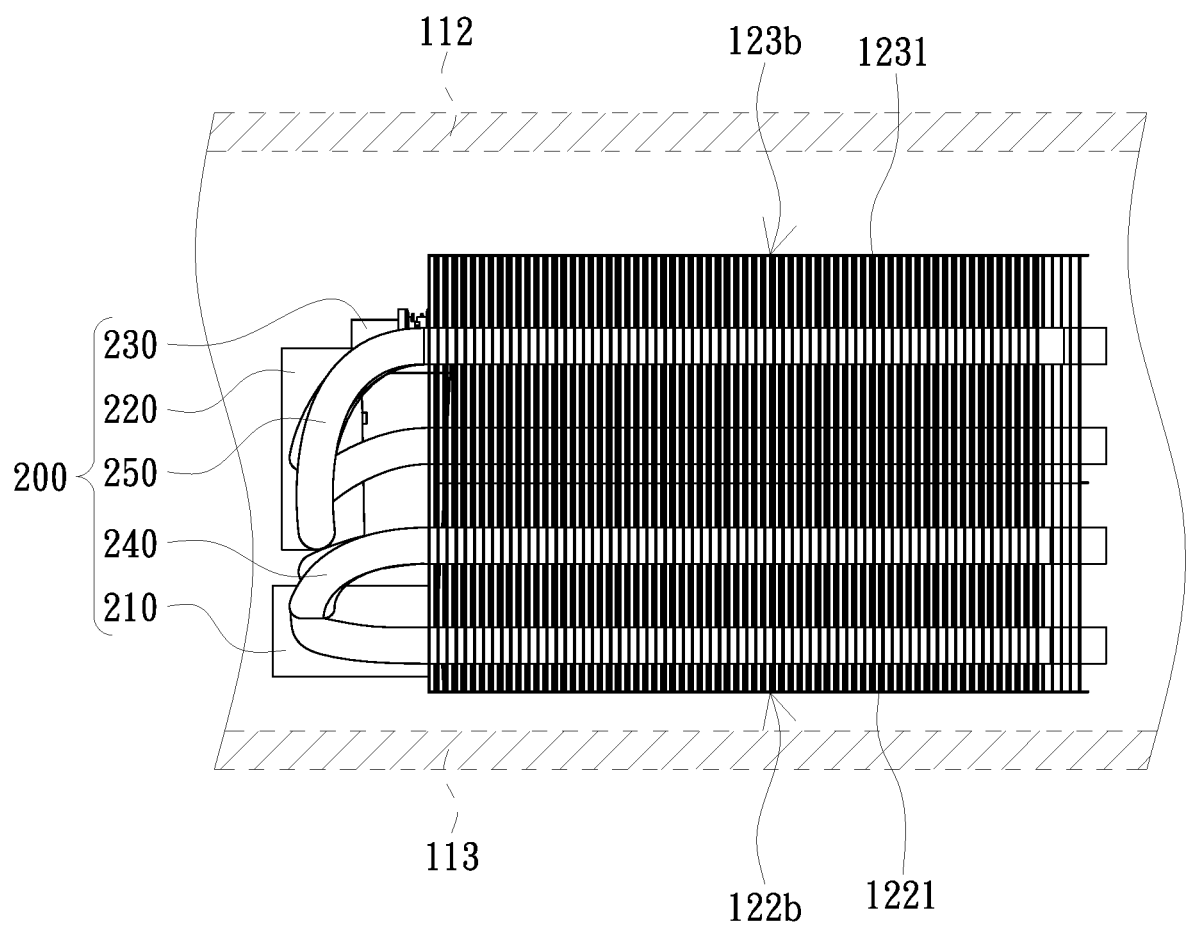
FIG. 6 is a schematic left view of the first heat-dissipating fin assembly, the second heat-dissipating fin assembly, and the light source modules shown in FIG. 5.

The first heat-dissipating fin assembly 122 includes a plurality of first heat-dissipating fins 1221 sequentially-arranged at intervals (FIG. 6). The second heat-dissipating fin assembly 123 includes a plurality of second heat-dissipating fins 1231 sequentially-arranged at intervals (FIG. 6). In the embodiment, the first heat-dissipating fin assembly 122 and the second heat-dissipating fin assembly 123 have a same structural design and dimensions. That is, the number of the first heat-dissipating fin 1221 and the number of second heat-dissipating fin 1231 are the same, the overall appearance dimensions (such as length, width, and height) of the first heat-dissipating fin assembly 122 and the over appearance dimensions (such as length, width, and height) of the second heat-dissipating fin assembly 123 are the same, and the overall volume of the first heat-dissipating fin assembly 122 and the overall volume of the second heat-dissipating fin assembly 123 are the same. Accordingly, the heat dissipation performances (efficiency) of the first heat-dissipating fin assembly 122 and the second heat-dissipating fin assembly 123 tend to be consistent. The first heat-dissipating fin assembly 122 and the second heat-dissipating fin assembly 123 may be manufactured by the same mold, so as to lower the manufacturing costs. Further, the same overall appearance dimensions of the first heat-dissipating fin assembly 122 and the second heat-dissipating fin assembly 123 refers to the difference between the overall appearance dimensions of the first heat-dissipating fin assembly 122 and the over appearance dimensions of the second heat-dissipating fin assembly 123 is less than 5 mm$^3$. The same overall volume of the first heat-dissipating fin assembly 122 and the second heat-dissipating fin assembly 123 refers to the difference between the overall volume of the first heat-dissipating fin assembly 122 and the over volume of the second heat-dissipating fin assembly 123 is less than 5%. In addition, the first heat-dissipating fins 1221 and the second heat-dissipating fins 1231 may be made of the same kind of material or materials having similar thermal conductivities, so as to increase the consistency in the heat dissipation performances of the first heat-dissipating fin assembly 122 and the second heat-dissipating fin assembly 123. In other embodiments, the number of the first heat-dissipating fin 1221 of the first heat-dissipating fin assembly 122 and the number of the second heat-dissipating fin 1231 of the second heat-dissipating fin assembly 123 may be different, the overall appearance dimensions (such as length, width, and height) of the first heat-dissipating fin assembly 122 and the over appearance dimensions (such as length, width, and height) of the second heat-dissipating fin assembly 123 may also be different, and the overall volume of the first heat-dissipating fin assembly 122 and the overall volume of the second heat-dissipating fin assembly 123 do not have to be the same.

The light source heat-dissipating device 100 may further include a first air duct 140. The first air duct 140 is adjacently-disposed at the air intake side 121. The first air duct 140 has a first entrance end 141 and a first exit end 142 opposite to the first entrance end 141. The first entrance end 141 is connected with the air inlet 111. The cross-sectional area of the air inlet 111 is larger than the cross-sectional area of the first entrance end 141. The material of the first air duct 140 may be, for example, polymer material or metal material, but the invention is not limited thereto.

In addition, the first air duct 140 may be flexible; in this way, the first air duct 140 can be appropriately bent in comply with other components in the casing 110 to place the first exit end 142 to a predetermined position. The air outside the casing 110 can enter the first air duct 140 via the air inlet 111 and the first entrance end 141. The first air duct 140 guides the air to a location of the air intake side 121 of the heat-dissipating fin assembly 120 further away from the air inlet 111, for example, a region of the air intake side 121 corresponding to where the first heat-dissipating fin assembly 122 and the second heat-dissipating fin assembly 123 connected or a region of the air intake side 121 corresponding to the second heat-dissipating fin assembly 123, so as to adjust the heat dissipation performances of the first heat-dissipating fin assembly 122 and the second heat-dissipating fin assembly 123, and thereby making the heat dissipation performances of the first heat-dissipating fin assembly 122 and the second heat-dissipating fin assembly 123 tend to be consistent. Further, the outside air is guided to the second heat-dissipating fin assembly 123 via the first exit end 142 of the first air duct 140, and the outside air directed to the first heat-dissipating 122 via part of the air inlet 111 not connected with the first entrance end 141 of the first air duct 140, and thereby makes the first heat-dissipating fin assembly 122 and the second heat-dissipating fin assembly 123 have a consistent temperature (such as temperature of the air intake side 121, surrounding temperature, or intake air temperature), the consistent temperature is identical to the temperature of the outside air entering from the air inlet 111. The heat dissipation performances of the first heat-dissipating fin assembly 122 and the second heat-dissipating fin assembly 123 are adjusted to be consistent with each other.

In the embodiment, the height of the first exit end 142 (the distance from the bottom portion 113 to the first exit end 142) is at least higher than the height of the first heat-dissipating fin assembly 122 (the distance from the bottom portion 113 to the top side of the first heat-dissipating fin assembly 122), so as to make the first exit end 142 position at the location where the air intake side 121 corresponds to the second heat-dissipating fin assembly 123 to promote the heat dissipation performance of the second heat-dissipating fin assembly 123, but the invention is not limited thereto. In addition, referring to FIG. 2, the first heat-dissipating fin assembly 122 and the second heat-dissipating fin assembly 123 have the same width W at the air intake side 121. The first exit end 142 has an inner diameter D. The inner diameter D of the first exit end 142 may be smaller than 50% of the width W.

In the embodiment, when the light source heat-dissipating device 100 is in use, the first heat-dissipating fin assembly 122 is disposed on a transmission path of a first thermal energy generated by a first light source module 210 of a light source device 200 when the light source device 200 provides an illumination beam, and the second heat-dissipating fin assembly 123 is disposed on a transmission path of a second thermal energy generated by a second light source module 220 of the light source device 200 when the light source device 200 provides the illumination beam. The first light source module 210 and the second light source module 220 are connected with a light combining module 230. The light combining module 230 has a plurality of optical components. The air inlet 111 is positioned between the light combining module 230 and the air intake side 121. A light valve generates a third thermal energy when converting the illumination beam into an image beam. The light combining module 230 generates a fourth thermal energy when the light source device 200 provides the illumination beam. In the embodiment, the first thermal energy may be transferred to the first heat-dissipating fin assembly 122 via a first heat pipe 240, and the second thermal energy may be transferred to the second heat-dissipating fin assembly 123 via a second heat pipe 250, but the invention is not limited thereto. In addition, the first light source module 210 and the second light source module 220 may have the same structure and composition.

The fan 130 causes the air between the top portion 112 and the bottom portion 113 of the casing 110 to move transversely and generate airflow. The third thermal energy and the fourth thermal energy generated by the other heat generating components, such as the light valve or the light combining module 230, can flow toward the first heat-dissipating fin assembly 122 and the second heat-dissipating fin assembly 123 together by means of the airflow. The airflow can bring the third thermal energy and the fourth thermal energy to enter the first heat-dissipating fin assembly 122 and the second heat-dissipating fin assembly 123 from the air intake side 121. The first thermal energy and the second thermal energy arrived at the first heat-dissipating fin assembly 122 and the second heat-dissipating fin assembly 123 via the first heat pipe 240 and the second heat pipe 250 can leave the first heat-dissipating fin assembly 122 and the second heat-dissipating fin assembly 123 with the third thermal energy and the fourth thermal energy from the exhaust side 124 (opposite to the air intake side 121) by means of the airflow, so as to achieve the effect of dissipating the first thermal energy, the second thermal energy, the third thermal energy, and the fourth thermal energy.

In addition, while dissipating the first thermal energy, the second thermal energy, the third thermal energy, and the fourth thermal energy, the air entering the casing 110 from the air inlet 111 of the bottom portion 113 of the casing 100 via the air duct 140 can adjust the temperatures of the first heat-dissipating fin assembly 122 and the second heat-dissipating fin assembly 123 at the air intake side 121, so as to make the temperatures of the first heat-dissipating fin assembly 122 and the second heat-dissipating fin assembly 123 at the air intake side 121 tend to be consistent and make the heat dissipation efficiencies of the first heat-dissipating fin assembly 122 and the second heat-dissipating fin assembly 123 121 tend to be consistent, and thereby making the service lives and the temperatures of the first light source module 210 and the second light source module 220 tend to be consistent.

Further, while the first heat-dissipating fin assembly 122 and the second heat-dissipating fin assembly 123 provide similar heat dissipation efficiencies, since the first heat-dissipating fin assembly 122 and the second heat-dissipating fin assembly 123 are stacked with each other, the first heat-dissipating fin assembly 122 and the second heat-dissipating fin assembly 123 can be disposed at the identical location in the casing 110, and thereby facilitating the optimal configuration of the components inside the projection apparatus.

Figure 3:
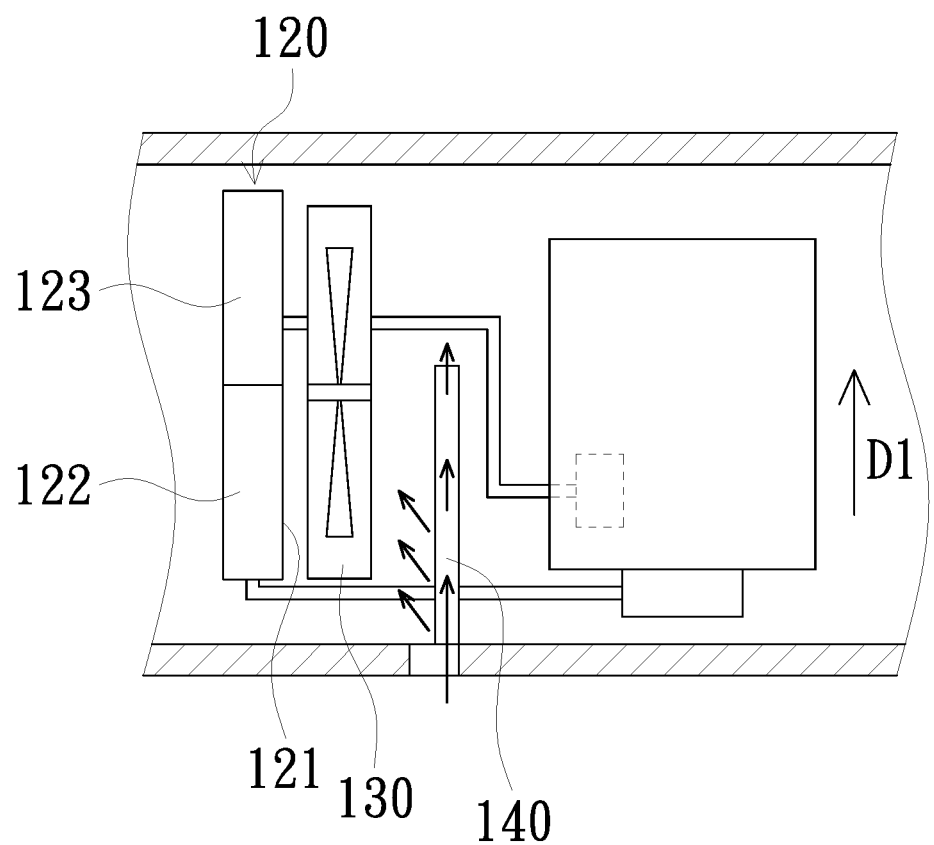
FIG. 3 is a schematic side view of a light source heat-dissipating device according to another embodiment of the invention.

FIG. 3 is a schematic side view of a light source heat-dissipating device according to another embodiment of the invention. Referring to FIG. 3, in the light source heat-dissipating device 100 of the embodiment, the fan 130 is disposed at the air intake side 121 of the heat-dissipating assembly 120, and the fan 130 may be disposed between the first air duct 140, and the first and second heat-dissipating fin assemblies 122, 123, but the invention is not limited thereto. The first air duct 140 has an extension direction D1 substantially parallel to the air intake side 121.

Figure 4:
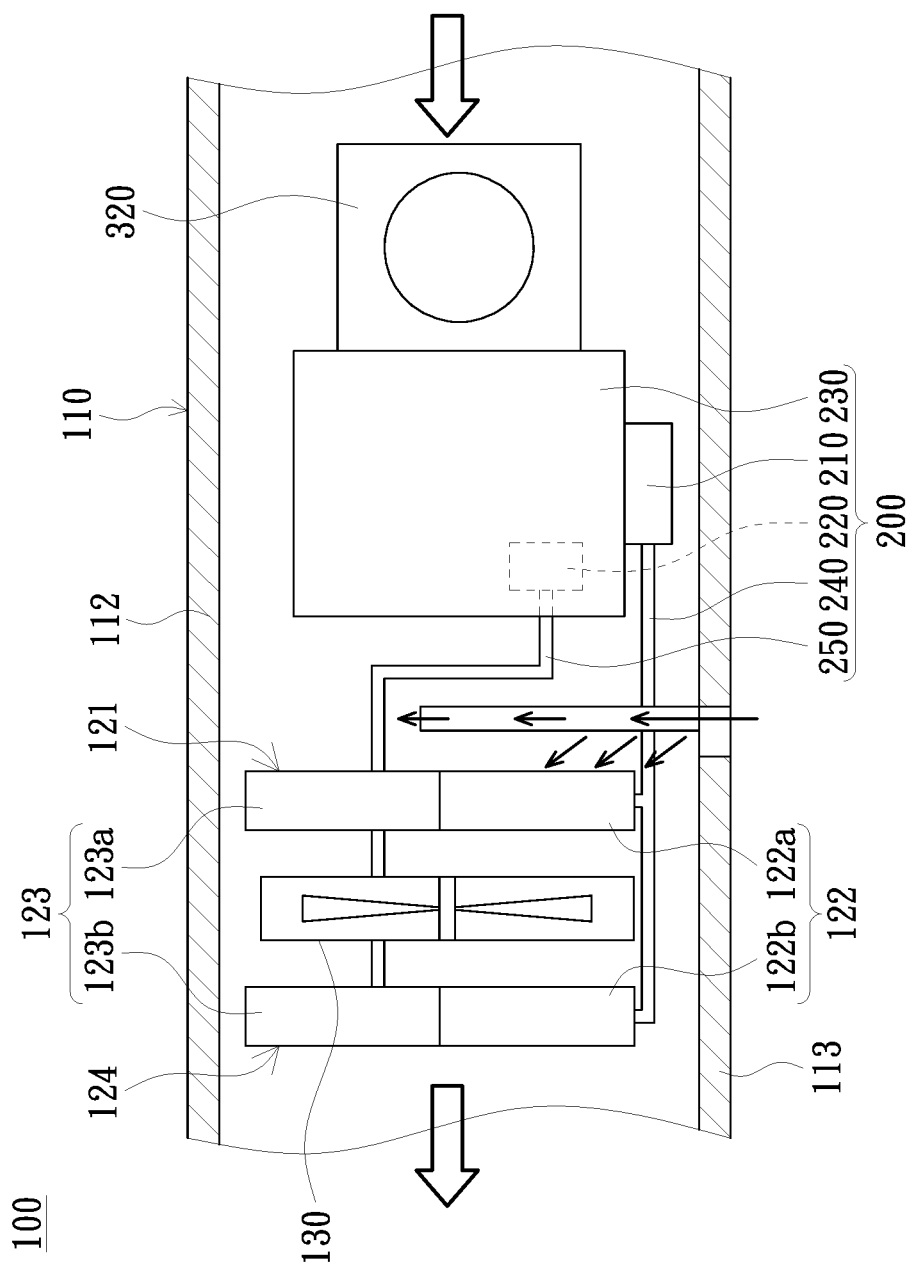
FIG. 4 is a schematic side view of a light source heat-dissipating device according to still another embodiment of the invention.
Figure 5:
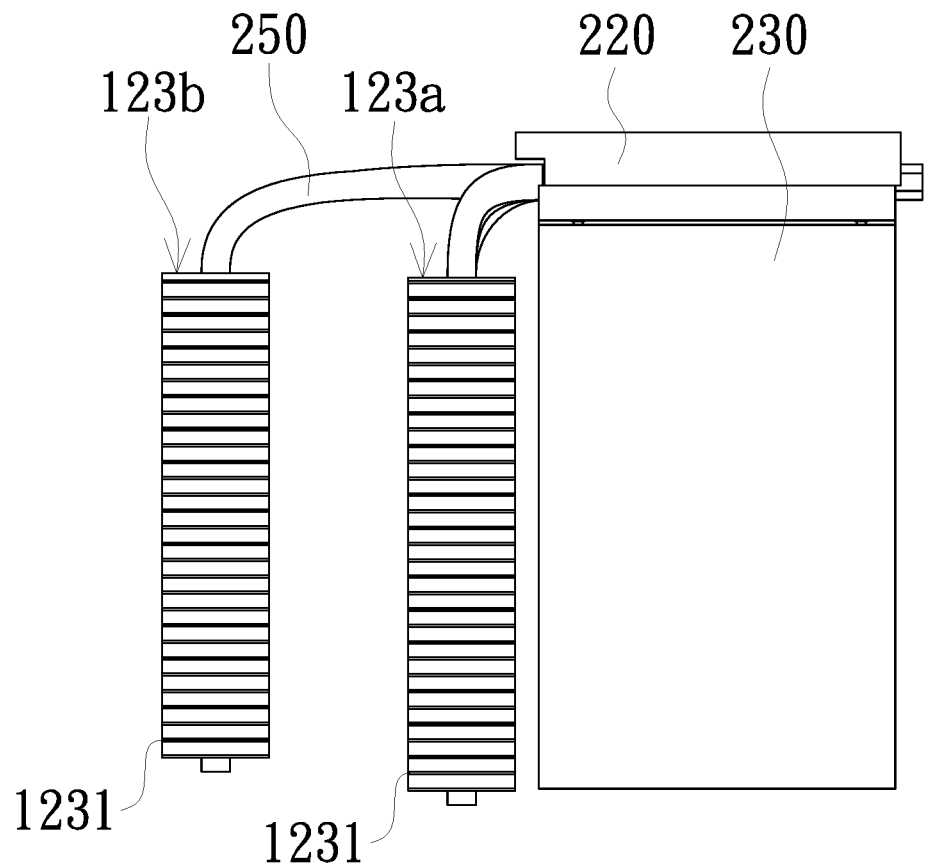
FIG. 5 is a schematic top view of a first heat-dissipating fin assembly, a second heat-dissipating fin assembly, and light source modules shown in FIG. 4.

FIG. 4 is a schematic side view of a light source heat-dissipating device according to still another embodiment of the invention. FIG. 5 is a schematic top view of a first heat-dissipating fin assembly, a second heat-dissipating fin assembly, and light source modules shown in FIG. 4. FIG. 6 is a schematic left view of the first heat-dissipating fin assembly, the second heat-dissipating fin assembly, and the light source modules shown in FIG. 5. Referring to FIGS. 4 to 6, in the light source heat-dissipating device 100 of the embodiment, the first heat-dissipating fin assembly 122 further includes a first upstream fin assembly 122a and a first downstream fin assembly 122b. The first upstream fin assembly 122a is disposed between the air intake side 121 and the first downstream fin assembly 122b. The first downstream fin assembly 122b is disposed between the exhaust side 124 and the first upstream fin assembly 122a. The second heat-dissipating fin assembly 123 further includes a second upstream fin assembly 123a and a second downstream fin assembly 123b. The second upstream fin assembly 123a is disposed between the air intake side 121 and the second downstream fin assembly 123b. The second downstream fin assembly 123b is disposed between the exhaust side 124 and the second upstream fin assembly 123a. The second upstream fin assembly 123a is stacked on the first upstream fin assembly 122a. The second downstream fin assembly 123b is stacked on the first downstream fin assembly 122b. In addition, the fan 130 may be disposed between the first upstream fin assembly 122a and the first downstream fin assembly 122b, and between the second upstream fin assembly 123a and the second downstream fin assembly 123b.

In the embodiment, the number of the first heat-dissipating fin 1221 included in the first upstream fin assembly 122a is the same as the number of the second heat-dissipating fin 1231 included in the second upstream fin assembly 123a, and the number of the first heat-dissipating fin 1221 included in the first downstream fin assembly 122b is the same as the number of the second heat-dissipating fin 1231 included in the second downstream fin assembly 123b. The overall appearance dimensions (such as length, width, and height) of the first upstream fin assembly 122a are the same as the overall appearance dimensions (such as length, width, and height) of the second upstream fin assembly 123a. The overall appearance dimensions (such as length, width, and height) of the first downstream fin assembly 122b are the same as the overall appearance dimensions (such as length, width, and height) of the second downstream fin assembly 123b. The overall volume of the first upstream fin assembly 122a is the same as the overall volume of the second upstream fin assembly 123a. The overall volume of the first downstream fin assembly 122b is the same as the overall volume of the second downstream fin assembly 123b. Accordingly, the heat dissipation performances of the first upstream fin assembly 122a and the second upstream fin assembly 123a may tend to be consistent, and the heat dissipation performances of the first downstream fin assembly 122b and the second downstream fin assembly 123b may tend to be consistent. In addition, the first upstream fin assembly 122a and the second upstream fin assembly 123a may be manufactured by the same mold, and the first downstream fin assembly 122b and the second downstream fin assembly 123b may be manufactured by the same mold.

The same overall appearance dimensions of the first upstream fin assembly 122a and the second upstream fin assembly 123a refers to the difference between the overall appearance dimensions of the first upstream fin assembly 122a and overall appearance dimensions of the second upstream fin assembly 123a is less than 5 mm$^3$. The same overall volume of the first upstream fin assembly 122a and the second upstream fin assembly 123a refers to the difference between the overall volume of the first upstream fin assembly 122a and the second upstream fin assembly 123a is less than 5%. Similarly, the same overall appearance dimensions of the first downstream fin assembly 122b and the second downstream fin assembly 123b refers to the difference between the overall appearance dimensions of the first downstream fin assembly 122b and overall appearance dimensions of the second downstream fin assembly 123b is less than 5 mm$^3$. The same overall volume of the first downstream fin assembly 122b and the second downstream fin assembly 123b refers to the difference between the overall volume of the first downstream fin assembly 122b and the second downstream fin assembly 123b is less than 5%. In another embodiment, the number of the first heat-dissipating fin 1221 included in the first upstream fin assembly 122a is different from the number of the second heat-dissipating fin 1231 included in the second upstream fin assembly 123a, and the number of the first heat-dissipating fin 1221 included in the first downstream fin assembly 122b is different from the number of the second heat-dissipating fin 1231 included in the second downstream fin assembly 123b. The overall appearance dimensions (such as length, width, and height) of the first upstream fin assembly 122a may be different from the overall appearance dimensions (such as length, width, and height) of the second upstream fin assembly 123a. The overall appearance dimensions (such as length, width, and height) of the first downstream fin assembly 122b may be different from the overall appearance dimensions (such as length, width, and height) of the second downstream fin assembly 123b. The overall volume of the first upstream fin assembly 122a does not have to be the same as the overall volume of the second upstream fin assembly 123a. The overall volume of the first downstream fin assembly 122b does not have to be the same as the overall volume of the second downstream fin assembly 123b. It is worth mentioning that the widths and the lengths of the first heat dissipating fin 1221 and the second heat dissipating fin 1231 may be the same, but the volumes of the first heat-dissipating fin assembly 122 and the second heat-dissipating fin assembly 123 do not have to be the same. Accordingly, the heat dissipation performances of the first upstream fin assembly 122a and the second upstream fin assembly 123a may tend to be consistent, and the heat dissipation performances of the first downstream fin assembly 122b and the second downstream group 123b may tend to be consistent.

In the embodiment, the first heat-dissipating fins 1221 longitudinally extend (extending along the direction vertical to the page, referring to FIG. 5) between the top portion 112 and the bottom portion 113 of the casing 110, and the second heat-dissipating fins 1231 longitudinally extend (extending along the direction vertical to the page) between the top portion 112 and the bottom portion 113 of the casing 110, but the invention is not limited thereto.

In the light source heat-dissipating device 100 of the embodiment, the first thermal energy generated by the first light source module 210 can be transferred to the first upstream fin assembly 122a and the first downstream fin assembly 122b via the first heat pipe 240, the second thermal energy generated by the second light source module 220 can be transferred to the second upstream group 123a and the second downstream fin assembly 123b via the second heat pipe 250. After the airflow generated by the fan 130 brings the third thermal energy and the fourth thermal energy generated by the light valve and the light combining module 230 to enter the first heat-dissipating fin assembly 122 and the second heat-dissipating fin assembly 123 from the air intake side 121, the airflow passes through the first upstream fin assembly 122a and the second upstream fin assembly 123a first, and then sequentially passes through the first downstream fin assembly 122b and the second downstream fin assembly 123b. While the airflow passes through the first upstream fin assembly 122a, the second upstream fin assembly 123a, the first downstream fin assembly 122b, and the second downstream fin assembly 123b, the first thermal energy, the second thermal energy, the third thermal energy, and the fourth thermal energy flows toward the exhaust side 124 with the airflow, and the third thermal energy, and the fourth thermal energy may leave the first heat-dissipating fin assembly 122 and the second heat-dissipating fin assembly 123 from the exhaust side 124. The first thermal energy and the second thermal energy accumulated at the upstream fin assembly and the downstream fin assembly may be dissipated by means of the flowing of the airflow. In addition, by the arrangement of the first and the second upstream fin assemblies 122a, 123a and the first and the second downstream fin assemblies 122b, 123b, the first and the second thermal energy generated by the first and the second light source modules 210, 220 can be dissipated rapidly.

Figure 7:
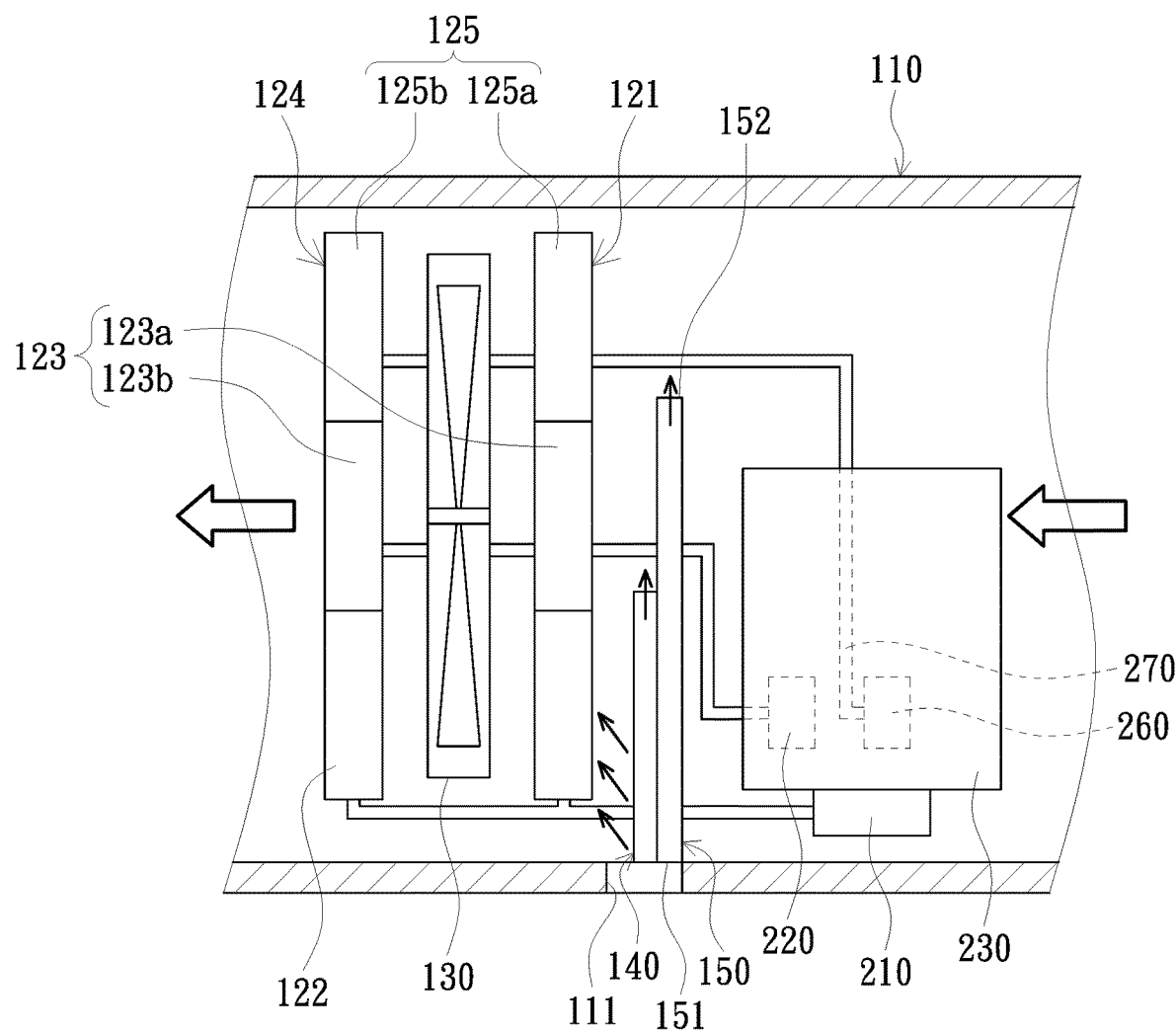
FIG. 7 is a schematic diagram of a light source heat-dissipating device according to further another embodiment of the invention.

FIG. 7 is a schematic diagram of a light source heat-dissipating device according to further another embodiment of the invention. Referring to FIG. 7, in the light source heat-dissipating device 100 of the embodiment, the heat-dissipating fin assembly further includes a third heat-dissipating fin assembly 125. The third heat-dissipating fin assembly 125 is stacked on the second heat-dissipating fin assembly 123. The light source heat-dissipating device 100 may further include a second air duct 150. The second air duct 150 is disposed at the air intake side 121. The second air duct 150 has a second entrance end 151 and a second exit end 152 opposite to the second entrance end 151. The second entrance end 151 is connected with the air inlet 111. The second air duct 150 is flexible. In this way, the second air duct 150 can be appropriately bent in comply with other components in the casing 110 to place the second exit end 152 to a predetermined position. In addition, the cross-sectional area of the air inlet 111 is larger than the cross-sectional area of the second entrance end 151, and the cross-sectional area of the air inlet 111 is larger than summation of the cross-sectional area of the second entrance end 151 and the cross-sectional area of the first entrance end 141.

Similar to the consistency in the heat dissipation performances of the first heat-dissipating fin assembly 122 and the second heat-dissipating fin assembly 123 by using the first air duct 140, the consistency in the heat dissipation performances of the second heat-dissipating fin assembly 123 and the third heat-dissipating fin assembly 125 may be achieved by using the second air duct 150. The air outside the casing 110 may be guided to the second entrance end 151 and enter the second air duct 150 via the air inlet 111, the second air duct 150 may guide the outside air to a region of the air intake side 121 corresponding to where the second heat-dissipating fin assembly 123 and the third heat-dissipating fin assembly 125 connected or a region of the air intake side 121 corresponding to the third heat-dissipating fin assembly 125, so as to adjust the heat dissipation performances of the second heat-dissipating fin assembly 123 and the third heat-dissipating fin assembly 125, and thereby making the heat dissipation performances of the second heat-dissipating fin assembly 123 and the third heat-dissipating fin assembly 125 tend to be consistent. Accordingly, by means of the first air duct 140 and the second air duct 150, the performances of the first heat-dissipating fin assembly 122, the second heat-dissipating fin assembly 123, and the third heat-dissipating fin assembly 125 may tend to be consistent.

In addition, in the embodiment, the height of the second exit end 152 (the distance from the bottom portion 113 to the second exit end 152) may be at least higher than the height of the second heat-dissipating fin assembly 123 (the distance from the bottom portion 113 to the top side of the second heat-dissipating fin assembly 123), so that the second exit end 152 is positioned at the location of the air intake side 121 corresponding the third heat-dissipating fin assembly 125, and thereby promoting the heat dissipation performance of the third heat-dissipating fin assembly 125, but the invention is not limited thereto. Further, the first heat-dissipating fin assembly 122, the second heat-dissipating fin assembly 123, and the third heat-dissipating fin assembly 125 have widths at the air intake side 121. The second entrance end 151 has an inner diameter. The inner diameter of the second entrance end 151 may be less than 50% of the widths.

The third heat-dissipating fin assembly 125 may further include a third upstream fin assembly 125a and a third downstream fin assembly 125b. The third upstream fin assembly 125a is disposed between the third downstream fin assembly 125b and the air intake side 121. The third downstream fin assembly 125b is disposed between the third upstream fin assembly 125a and the exhaust side 124. The third upstream fin assembly 125a is stacked on the second upstream fin assembly 123a. The third downstream fin assembly 125b is stacked on the second downstream fin assembly 123b. In addition, the fan 130 is disposed between the third upstream fin assembly 125a and the third downstream fin assembly 125b; in other words, the third upstream fin assembly 125a and the third downstream fin assembly 125b are disposed at two opposite sides of the fan 130.

When the light source heat-dissipating device 100 of the embodiment is in use, the third heat-dissipating fin assembly 125 is disposed on a transmission path of a fifth thermal energy generated by a third light source module 260 of the light source device. The fifth thermal energy is generated by the third light source module 260 when the light source device provides the illumination beam. The first light source module 210, the second light source module 220, and the third light source module 260 are connected with the light combining module 230. The first light source module 210, the second light source module 220, and the third light source module 260 may have the identical structure and composition. The fifth thermal energy may be directed to the third upstream fin assembly 125a and the third downstream fin assembly 125b of the third heat-dissipating fin assembly 125 via the third heat pipe 270. After the airflow formed by the operation of the fan 130 brings the third thermal energy and the fourth thermal energy generated by the light valve and the light combining module 230 to enter the first heat-dissipating fin assembly 122, the second heat-dissipating fin assembly 123, and the third heat-dissipating fin assembly 125 from the air intake side 121, the airflow passes through the first upstream fin assembly 122a, the second upstream fin assembly 123a, and the third upstream fin assembly 125a first, and then passes through the first downstream fin assembly 122b, the second downstream fin assembly 123b, and the third downstream fin assembly 125b. While the airflow passes through the first upstream fin assembly 122a, the second upstream fin assembly 123a, the third upstream fin assembly 125a, the first downstream fin assembly 122b, the second downstream fin assembly 123b, and the third downstream fin assembly 125b, the first thermal energy, the second thermal energy, the fifth thermal energy, and the third and the fourth thermal energies carried by the airflow flow together toward the exhaust side 124, and the third and the fourth thermal energies leave the first heat-dissipating fin assembly 122, the second heat-dissipating fin assembly 123, and the third heat-dissipating fin assembly 125 by means of the airflow.

Figure 8:
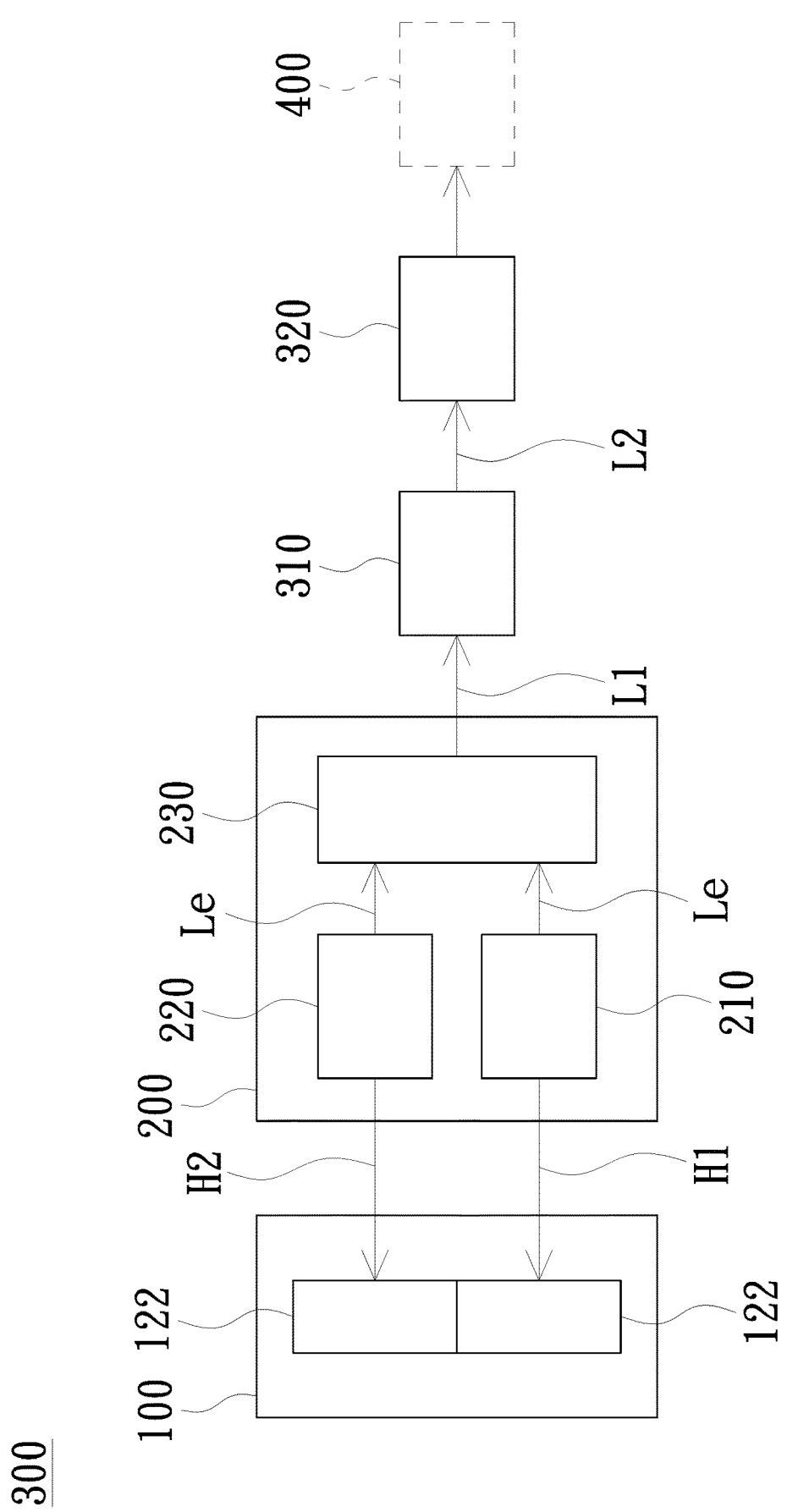
FIG. 8 is a schematic block diagram of a projection apparatus according to an embodiment of the invention.

FIG. 8 is a schematic block diagram of a projection apparatus according to an embodiment of the invention. Referring to FIGS. 4 to 6, and 8, the projection apparatus 300 of the embodiment includes a light source device 200, a light valve 310, a projection lens 320, and a light source heat-dissipating device 100. The light source 200 is configured to provide an illumination beam L1. The light valve 310 is disposed on a transmission path of the illumination beam L1, so as to convert the illumination beam L1 into an image beam L2. The light valve 310 is disposed between the projection lens 320 and the light source heat-dissipating device 100. The projection lens 320 is disposed on a transmission path of the image beam L2, so as to project the image beam L2 to a projection target 400, such as a wall or a screen, and thereby forming an image on the projection target 400. The light source heat-dissipating device 100 is disposed on a transmission path of a heat generated when the light source device 200 provides the illumination beam L1 and the light valve 310 provides the image beam L2. The light source device 200 includes a first light source module 210 and a second light source module 220. The first light source module 210 and the second light source module 220 are configured to provide the illumination beam L1, and the light source module 210 and the second light source module 220 generate a first thermal energy H1 and a second thermal energy H2 respectively while providing the illumination beam L1. The light valve 310 generates a third thermal energy while providing the image beam L2. The heat includes the first thermal energy H1, the second thermal energy H2, and the third thermal energy. The air inlet 111 of the light source heat-dissipating device 100 is positioned between the air intake side 121 and the light source device 200 and the light valve 310. The first heat-dissipating fin assembly 122 and the second heat-dissipating fin assembly 123 are disposed on a transmission path of the third thermal energy.

In addition, the light valve 310 may be a reflective light valve or a transmissive light valve. The reflective light valve may be a digital micro-mirror device (DMD) or a liquid crystal on silicon (LCOS) panel, and the transmissive light valve may be a transmissive liquid crystal panel, but the invention is not limited thereto. The projection lens 320 may include, for example, one or a combination of a plurality of optical lenses having diopter, such as a various combinations of non-planar lenses including biconcave lenses, biconvex lenses, concavo-convex lenses, convexo-concave lenses, plano-convex lenses, and plano-concave lenses. In an embodiment, the projection lens 320 may also include a planar optical lens.

The first light source module 210 and the second light source module 220 above, may be, for example, a diode module including a light emitting diode or a laser diode (LD), or a diode module bank array composed of a plurality of diode modules, configured to provide the illumination beam L1, but the invention is not limited thereto. Further, the first light source module 210 and the second light source module 220 can provide excitation lights Le. And the light source device 200 further includes a light combining module 230 disposed on a transmission path of the excitation lights Le for combining the excitation lights Le to provide the illumination beam L1. In addition, in the embodiment, the casing 110 of the projection apparatus 300 can be used to be mounted by or house the light source device 200, light valve 310, or projection lens 320, but the invention is not limited thereto. Although FIG. 8 illustrates the light source heat-dissipating device 100 in FIGS. 4 to 6 as an example, the light source heat-dissipating device 100 may be replaced with light source heat-dissipating device of any one of the above-mentioned embodiments. Further, the light source device 200 may include a third light source module as demand; that is, the number of the light source module of the light source device 200 may be increased or decreased as demand. The invention does not limit the number of light source module of the light source device 200. Meanwhile, the number of heat-dissipation fin assembly of the heat-dissipating fin assembly 120 of the light source heat-dissipating device 100 can be adjusted according to the number of light source module of the light source device 200.

In the light source heat-dissipating device and the projection apparatus of the embodiments of the invention, since the fan is disposed in the casing and is adjacent to the first heat-dissipating fin assembly and the second heat-dissipating fin assembly, the second heat-dissipating fin assembly is stacked on the first heat-dissipating fin assembly, and the air inlet is adjacent to the air intake side, when the airflow generated after the fan is turned on brings the heat generated by the heat generating components to enter the first heat-dissipating fin assembly and the second heat-dissipating fin assembly from the air intake side, the outside air entering the casing from the air inlet adjusts the temperatures of the first heat-dissipating fin assembly and the second heat-dissipating fin assembly at the air intake side, so as to make the temperatures of the first heat-dissipating fin assembly and the second heat-dissipating fin assembly at the air intake side tend to be consistent and make the heat dissipation performances of the first heat-dissipating fin assembly and the second heat-dissipating fin assembly at the air intake side tend to be consistent. Accordingly, the heat coming from the first light source module and the second light source module and positioned at the first heat-dissipating fin assembly and the second heat-dissipating fin assembly can be dissipated by the consistent heat dissipation efficiency, and thereby achieving the effect that the lives and the temperatures of the first light source module and the second light source module tend to be consistent. Hence, the light source heat-dissipating device and projection apparatus have advantages of improving the temperature and life consistency between light source modules. In addition, the first air duct can adjust the heat dissipation performances of the first heat-dissipating fin assembly and the second heat-dissipating fin assembly, so as to make the heat dissipation performances of the first heat-dissipating fin assemblies and the second heat-dissipating fin assembly tend to be consistent.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first air duct, the second air duct, the first entrance end, the second entrance end, the first exit end, the second exit end, the first heat-dissipating fin assembly, the second heat-dissipating fin assembly, the third heat-dissipating fin assembly, the first heat-dissipating fins, the second heat-dissipating fins, the first upstream fin assembly, the second upstream fin assembly, the third upstream fin assembly, the first downstream fin assembly, the second downstream fin assembly, the third downstream fin assembly, the first light source module, the second light source module, the third light source module, the first thermal energy, the second thermal energy, the third thermal energy, the fourth thermal energy, the fifth thermal energy, and so on, are only used for distinguishing various elements and do not limit the number of the elements.

What is claimed is:

1. A light source heat-dissipating device, configured to be disposed in a projection apparatus, the projection apparatus having a casing, the casing having an air inlet, and the light source heat-dissipating device comprising:
a heat-dissipating fin assembly, disposed in the casing, having an air intake side adjacent to the air inlet, and the heat-dissipating fin assembly comprising:

a first heat-dissipating fin assembly; and
a second heat-dissipating fin assembly, stacked on the first heat-dissipating fin assembly, and the first heat-dissipating fin assembly being positioned between the second heat-dissipating fin assembly and the air inlet;
a first air duct, adjacently-disposed at the air intake side and having:
a first entrance end, connected with the air inlet;
a first exit end, opposite to the first entrance end; and
an extension direction, pointing from the first entrance end to the first exit end, and the extension direction being substantially parallel to the air intake side; and
a fan, disposed in the casing, and adjacent to the first heat-dissipating fin assembly and the second heat-dissipating fin assembly;
wherein the first heat-dissipating fin assembly and the second heat-dissipating fin assembly are disposed between the air inlet and the fan in a transmission path of an airflow generated by the fan.

2. The light source heat-dissipating device according to claim 1, wherein a height of the first exit end is at least higher than a height of the first heat-dissipating fin assembly.

3. The light source heat-dissipating device according to claim 1, wherein the first heat-dissipating fin assembly and the second heat-dissipating fin assembly have widths at the air intake side, the first exit end has an inner diameter, and the inner diameter is less than 50% of the widths.

4. The light source heat-dissipating device according to claim 1, wherein the first heat-dissipating fin assembly and the second heat-dissipating fin assembly have a same structural design and dimensions.

5. The light source heat-dissipating device according to claim 1, wherein the first heat-dissipating fin assembly and the second heat-dissipating fin assembly have different structural designs and dimensions.

6. The light source heat-dissipating device according to claim 1, wherein the fan is disposed at the air intake side.

7. The light source heat-dissipating device according to claim 1, wherein the heat-dissipating fin assembly has an exhaust side opposite to the air intake side, and the fan is disposed at the exhaust side.

8. The light source heat-dissipating device according to claim 1, wherein the heat-dissipating fin assembly further comprises a third heat-dissipating fin assembly, and the third heat-dissipating fin assembly is stacked on the second heat-dissipating fin assembly.

9. The light source heat-dissipating device according to claim 1, wherein the heat-dissipating fin assembly further comprises a third heat-dissipating fin assembly, the third heat-dissipating fin assembly is stacked on the second heat-dissipating fin assembly, the light source heat-dissipating device further comprises a second air duct, the second air duct is disposed at the air intake side, and the second air duct has a second entrance end and a second exit end opposite to the second entrance end, the second entrance end is connected with the air inlet, and a height of the second entrance end is at least higher than a height of the second heat-dissipating fin assembly.

10. A light source heat-dissipating device, configured to be disposed in a projection apparatus, the projection apparatus having a casing, the casing having an air inlet, and the light source heat-dissipating device comprising:
a heat-dissipating fin assembly, disposed in the casing, having an air intake side adjacent to the air inlet, and the heat-dissipating fin assembly comprising:
a first heat-dissipating fin assembly; and
a second heat-dissipating fin assembly, stacked on the first heat-dissipating fin assembly, and the first heat-dissipating fin assembly being positioned between the second heat-dissipating fin assembly and the air inlet;
a first air duct, adjacently-disposed at the air intake side and having:
a first entrance end, connected with the air inlet;
a first exit end, opposite to the first entrance end; and
an extension direction, substantially parallel to the air intake side; and
a fan, disposed in the casing, and adjacent to the first heat-dissipating fin assembly and the second heat-dissipating fin assembly;
wherein the first heat-dissipating fin assembly comprises a first upstream fin assembly and a first downstream fin assembly, the first upstream fin assembly is disposed between the first downstream fin assembly and the air intake side, the second heat-dissipating fin assembly comprises a second upstream fin assembly and a second downstream fin assembly, the second upstream fin assembly is disposed between the air intake side and the second downstream fin assembly, and is stacked on the first upstream fin assembly, the second downstream fin assembly is stacked on the first downstream fin assembly, the fan is disposed between the first upstream fin assembly and the first downstream fin assembly, and the fan is disposed between the second upstream fin assembly and the second downstream fin assembly.

11. A projection apparatus, comprising a casing, the casing having an air inlet, and the projection apparatus comprising:
a light source device, configured to provide an illumination beam;
a light valve, disposed on a transmission path of the illumination beam to convert the illumination beam into an image beam;
a projection lens, disposed on a transmission path of the image beam; and
a light source heat-dissipating device, disposed on a transmission path of a heat generated when the light source device provides the illumination beam, and the light source heat-dissipating device comprising:
a heat-dissipating fin assembly, disposed in the casing, having an air intake side adjacent to the air inlet, and the heat-dissipating fin assembly comprising:
a first heat-dissipating fin assembly; and
a second heat-dissipating fin assembly, stacked on the first heat-dissipating fin assembly, and the first heat-dissipating fin assembly being positioned between the second heat-dissipating fin assembly and the air inlet;
a first air duct, adjacently-disposed at the air intake side and having:
a first entrance end, connected with the air inlet;
a first exit end, opposite to the first entrance end; and
an extension direction, pointing from the first entrance end to the first exit end, and the extension direction being substantially parallel to the air intake side; and
a fan, disposed in the casing, and adjacent to the first heat-dissipating fin assembly and the second heat-dissipating fin assembly;
wherein the light source device comprises a first light source module and a second light source module, the first light source module and the second light source module generate a first thermal energy and a second thermal energy respectively when the light source device provides the illumination beam, the heat comprises the first thermal energy and the second thermal energy, the first heat-dissipating fin assembly is disposed on a transmission path of the first thermal energy, and the second heat-dissipating fin assembly is disposed on a transmission path of the second thermal energy;

wherein the first heat-dissipating fin assembly and the second heat-dissipating fin assembly are disposed between the air inlet and the fan in a transmission path of an airflow generated by the fan.

12. The projection apparatus according to claim 11, wherein a height of the first exit end is at least higher than a height of the first heat-dissipating fin assembly.

13. The projection apparatus according to claim 11, wherein the first heat-dissipating fin assembly and the second heat-dissipating fin assembly have widths at the air intake side, the first exit end has an inner diameter, and the inner diameter is less than 50% of the widths.

14. The projection apparatus according to claim 11, wherein the first heat-dissipating fin assembly and the second heat-dissipating fin assembly have same structural design and dimensions.

15. The projection apparatus according to claim 11, wherein the first heat-dissipating fin assembly and the second heat-dissipating fin assembly have different structural designs and dimensions.

16. The projection apparatus according to claim 11, wherein the fan is disposed at the air intake side.

17. The projection apparatus according to claim 11, wherein the heat-dissipating fin assembly has an exhaust side opposite to the air intake side, and the fan is disposed at the exhaust side.

18. The projection apparatus according to claim 11, wherein the heat-dissipating fin assembly further comprises a third heat-dissipating fin assembly, and the third heat-dissipating fin assembly is stacked on the second heat-dissipating fin assembly.

19. The projection apparatus according to claim 11, wherein the heat-dissipating fin assembly further comprises a third heat-dissipating fin assembly, the third heat-dissipating fin assembly is stacked on the second heat-dissipating fin assembly, the light source heat-dissipating device further comprises a second air duct, the second air duct is disposed at the air intake side, and the second air duct has a second entrance end and a second exit end opposite to the second entrance end, the second entrance end is connected with the air inlet, and a height of the second entrance end is at least higher than a height of the second heat-dissipating fin assembly.

20. A projection apparatus, comprising a casing, the casing having an air inlet, and the projection apparatus comprising:
a light source device, configured to provide an illumination beam;
a light valve, disposed on a transmission path of the illumination beam to convert the illumination beam into an image beam;
a projection lens, disposed on a transmission path of the image beam; and
a light source heat-dissipating device, disposed on a transmission path of a heat generated when the light source device provides the illumination beam, and the light source heat-dissipating device comprising:
a heat-dissipating fin assembly, disposed in the casing, having an air intake side adjacent to the air inlet, and the heat-dissipating fin assembly comprising:
a first heat-dissipating fin assembly; and
a second heat-dissipating fin assembly, stacked on the first heat-dissipating fin assembly, and the first heat-dissipating fin assembly being positioned between the second heat-dissipating fin assembly and the air inlet;
a first air duct, adjacently-disposed at the air intake side and having:
a first entrance end, connected with the air inlet;
a first exit end, opposite to the first entrance end; and
an extension direction, substantially parallel to the air intake side; and
a fan, disposed in the casing, and adjacent to the first heat-dissipating fin assembly and the second heat-dissipating fin assembly;

wherein the light source device comprises a first light source module and a second light source module, the first light source module and the second light source module generate a first thermal energy and a second thermal energy respectively when the light source device provides the illumination beam, the heat comprises the first thermal energy and the second thermal energy, the first heat-dissipating fin assembly is disposed on a transmission path of the first thermal energy, and the second heat-dissipating fin assembly is disposed on a transmission path of the second thermal energy;

wherein the first heat-dissipating fin assembly comprises a first upstream fin assembly and a first downstream fin assembly, the first upstream fin assembly is disposed between the first downstream fin assembly and the air intake side, the second heat-dissipating fin assembly comprises a second upstream fin assembly and a second downstream fin assembly, the second upstream fin assembly is disposed between the air intake side and the second downstream fin assembly, and is stacked on the first upstream fin assembly, the second downstream fin assembly is stacked on the first downstream fin assembly, the fan is disposed between the first upstream fin assembly and the first downstream fin assembly, and the fan is disposed between the second upstream fin assembly and the second downstream fin assembly.

* * * * *